(12) United States Patent
Shen

(10) Patent No.: US 6,457,374 B1
(45) Date of Patent: Oct. 1, 2002

(54) GEARBOX FOR A MOTORCYCLE

(76) Inventor: Yen-Hsing Shen, No. 54, Lane 134, Tungan Road, Tainan City (TW)

( * ) Notice: Subject to any disclaimer, the term of this patent is extended or adjusted under 35 U.S.C. 154(b) by 44 days.

(21) Appl. No.: 09/738,101

(22) Filed: Dec. 18, 2000

(51) Int. Cl.[7] .......................... F16H 59/00; F16H 61/00; F16H 63/00
(52) U.S. Cl. .......................... 74/335; 74/332; 180/221
(58) Field of Search .......................... 74/335, 332, 334; 180/218, 221, 224, 226, 230

(56) References Cited

U.S. PATENT DOCUMENTS

| | | | | |
|---|---|---|---|---|
| 4,655,309 A | * | 4/1987 | Imaizumi et al. | 180/215 |
| 5,951,434 A | * | 9/1999 | Richards et al. | 475/284 |
| 6,119,539 A | * | 9/2000 | Papanicolaou | 74/112 |
| 6,142,123 A | * | 11/2000 | Galasso et al. | 123/486 |
| 6,276,480 B1 | * | 8/2001 | Aregger | 180/213 |

* cited by examiner

Primary Examiner—Sherry Estremsky
Assistant Examiner—Tisha D. Lewis
(74) Attorney, Agent, or Firm—Charles E. Baxley

(57) ABSTRACT

A gearbox for a motorcycle includes a casing containing a gear train therein. The gear train includes an input gear shaft rotatably mounted in the casing and operably connected to and thus driven by an engine of the motorcycle, and an output gear shaft rotatably mounted in the compartment and operably connected to one of at least two wheels of the motorcycle. A first gear and a second gear are rotatably mounted around the output gear shaft. A follower block is mounted around the output gear shaft and located between the first gear and the second gear. The follower block is slidable along a longitudinal axis of the output gear shaft for releasably engaging with one of the first gear and the second gear. A gear lever is operably connected to move the follower block between a first position where the follower block is engaged with the first gear such that the gearbox is in a forward gear for moving the motorcycle forward and a second position where the follower block is engaged with the second gear such that the gearbox is in a reverse gear for moving the motorcycle backward.

7 Claims, 8 Drawing Sheets

GEARBOX FOR A MOTORCYCLE

BACKGROUND OF THE INVENTION

1. Field of the Invention

The present invention relates to a gearbox for a motorcycle that allows the motorcycle to move backward.

2. Description of the Related Art

A typical motorcycle includes two wheels and cannot move backward. A motorcycle for handicappers or a beach motorcycle includes an engine and a gearbox used in a typical motorcycle and includes at least three wheels. It is not uncommon that a handicapped driver has to get off from his or her motorcycle to push it backward when there is a traffic jam, which is troublesome and inconvenient. The beach motorcycle may be stuck in a larger hole in the sand, which also requires the driver to push it backward. All of these result from failing to provide the backing function.

SUMMARY OF THE INVENTION

It is the primary object of the present invention to provide a gearbox for a motorcycle that allows the motorcycle to move backward. Operation of the gearbox is easy and the cost of the gearbox is low.

A gearbox for a motorcycle in accordance with the present invention comprises:

a casing including a compartment;

a gear train including:

an input gear means including a gear shaft rotatably mounted in the compartment and operably connected to and thus driven by an engine of the motorcycle, and an output gear means including a gear shaft rotatably mounted in the compartment and operably connected to one of at least two wheels of the motorcycle, a first gear and a second gear being rotatably mounted around the gear shaft of the output gear means, a follower block being mounted around the gear shaft of the output gear means and located between the first gear and the second gear, the follower block being slidable along a longitudinal axis of the gear shaft of the output gear means for releasably engaging with one of the first gear and the second gear; and a control device including a gear lever that is operably connected to move the follower block between a first position and a second position;

wherein when the follower block is in the first position, the follower block is engaged with the first gear such that the gearbox is in a forward gear for moving the motorcycle forward; and when the follower block is in the second position, the follower block is engaged with the second gear such that the gearbox is in a reverse gear for moving the motorcycle backward.

The follower block is movable to a third position where none of the first gear and the second gear is engaged with the follower block such that the gearbox is in a neutral gear.

A first transmission gear means includes a gear shaft rotatably mounted in the compartment. A third gear, a fourth gear, and a fifth gear are mounted on the gear shaft of the first transmission gear means to rotate therewith, the fourth gear being meshed with the first gear. A second transmission gear means includes a gear shaft rotatably mounted in the compartment. A sixth gear and a seventh gear are mounted to the gear shaft of the second transmission gear means to rotate therewith. The sixth gear is meshed with the fifth gear and the seventh gear is meshed with the second gear. The gear shaft of the input gear means includes an eighth gear provided thereon to rotate therewith, the eighth gear being meshed with the third gear.

The output gear means includes a longitudinal keyway and the follower block includes a longitudinal hole with a longitudinal key for engaging with the longitudinal keyway.

The first gear includes at least one engaging groove defined in a side thereof. The second gear includes at least one engaging groove defined in a side thereof. The follower block includes at least one protrusion on each of two sides thereof for releasable engaging with the engaging groove of the first gear and the engaging groove of the second gear, respectively.

The follower block includes a groove in a side thereof. The control device further comprises a control rod operably connected to the gear lever. The control rod is engaged with the groove of the follower block. Thus, the follower block is movable among the first position, the second position, and the third position upon manual operation on the gear lever.

In an-embodiment of the invention, the control device further comprises a positioning block securely attached to an end of the control rod, the positioning block including three positioning notches that correspond to the first position, the second position, and the third position of the follower block. An engaging block is biased to engage with one of the three positioning notches for retaining the positioning block in place, thereby retaining the control rod and the follower block in place.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
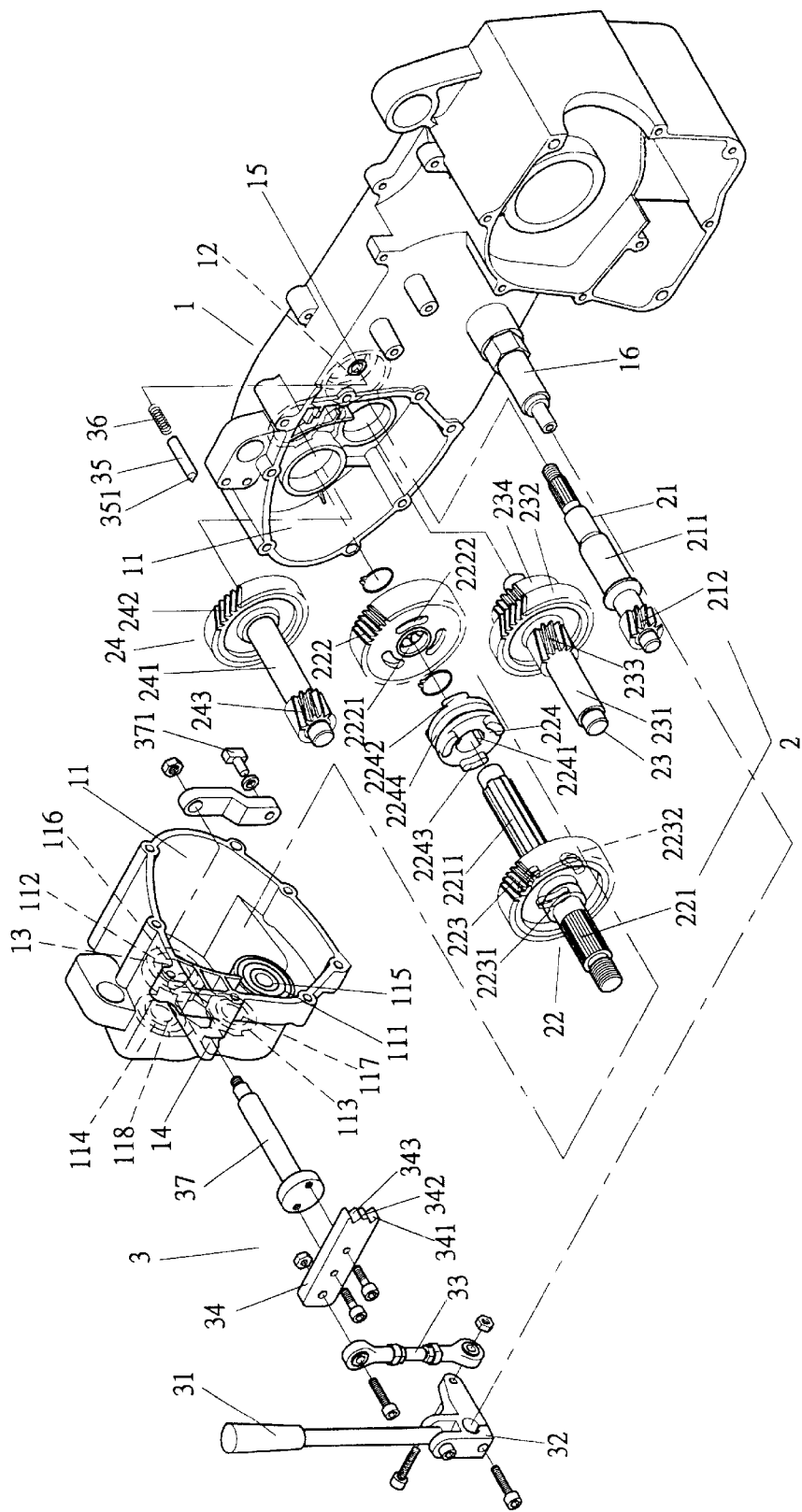
FIG. 1 is an exploded perspective view of a gearbox in accordance with the present invention.
Figure 2:
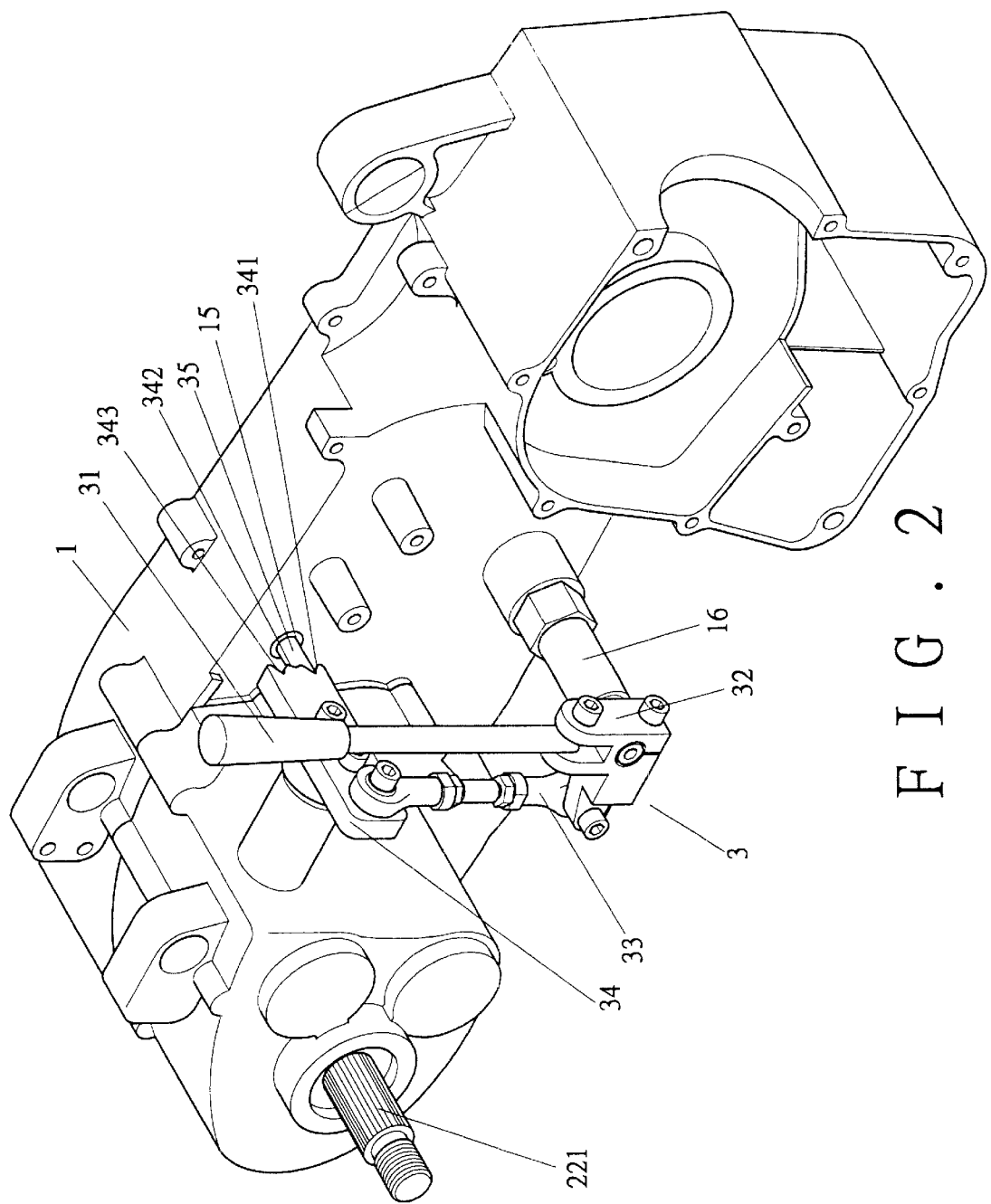
FIG. 2 is a perspective view of the gearbox in accordance with the present invention.
Figure 3:
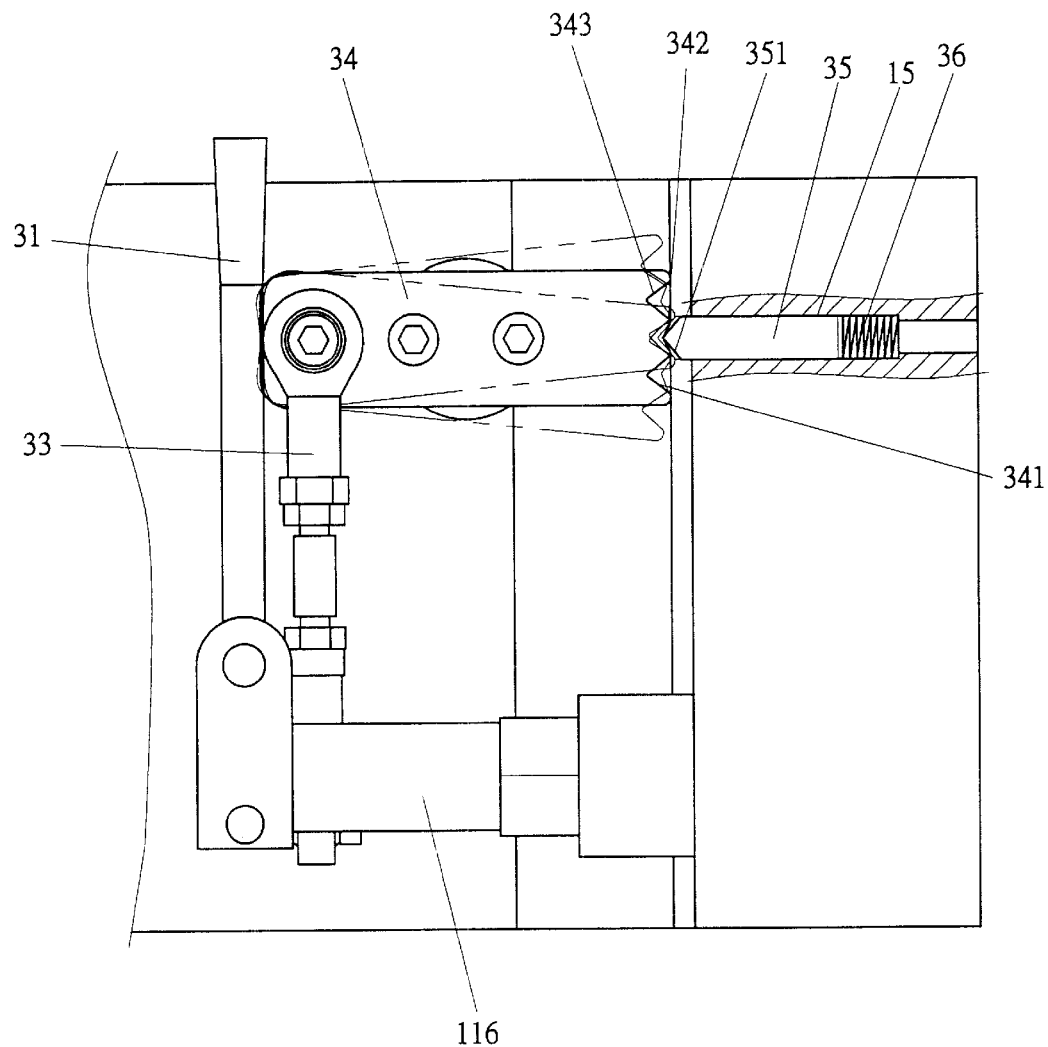
FIG. 3 is a partial view, partly sectioned, illustrating movement of a positioning block.

Referring to FIGS. 1 and 2, a gearbox in accordance with the present invention generally includes a casing 1, a gear train 2, and a control device 3. The casing 1 includes a compartment 11 for receiving the gear train 2. Grooves 111, 112, 113, and 114 for receiving gear shafts 211, 221, 231, and 241 of the gear train 2 and bearings 115, 116, 117, and 118 are mounted in the compartment 11 of the casing 1. In addition, through-holes 12 and 13 associated with an input gear means 21 and an output gear means 22 are defined in the casing 1. Furthermore, a through-hole 14 is defined in a side of the casing 1 for receiving an actuating rod 37, which will be described later.

The gear train 2 includes the input gear means 21, the output gear means 22, and two transmission gear means 23 and 24. Gear shaft 211 of the input gear means 21 is operably connected to an engine (not shown) and includes a gear 212 formed on an end thereof. Gear shaft 221 of the output gear means 22 is operably connected to one of the wheels of the motorcycles and includes at least one keyway 2211. The gear shaft 221 also includes first and second gears 222 and 223 and a follower block 224 mounted thereon. Each gear 222, 223 has a bearing 2221, 2231 mounted in a center thereof for rotatably engaging with the gear shaft 1. Each gear 222, 223 further includes an engaging groove 2222, 2232 on a side thereof for engaging the follower block 224. The follower block 224 includes protrusions 2242, 2243 on each of two sides thereof for releasably engaging with the engaging groove 2222, 2232. Thus, the follower block 24 is located between the gears 222 and 223. The follower block 224 further includes at least one key 2241 for engaging with the keyway 2211 of the gear shaft 221. The follower block 24 further includes a groove 2244 in a side thereof for engaging with the actuating rod 37.

The transmission gear means 23 includes a gear shaft 231 on which gears 232 and 233 are formed for respectively meshing with gears 212 of the input gear means 21 and the gear 222 of the output gear means 22. Thus, when the input gear means 21 is rotated, the gear shaft 231 and the gear 222 are driven. The gear shaft 231 further includes a gear 234 that meshes with the transmission gear means 24. The transmission gear means 24 includes a gear shaft 241 on which gears 242 and 243 are formed for respectively meshing with the gear 234 of the gear shaft 231 and the gear 223 of the output gear means 22. As a result, when the input gear mans 21 is turned, the transmission gear means 23 and 24 and the gear 223 are turned, and the rotational direction of the gear 223 is opposite to that of the gear 222.

The control device 3 includes a gear lever 31, a pivotal block 32, a link 33, a positioning block 34, an engaging block 35 with an engaging end 351, a spring 36, and the actuating rod 37. The gear lever 31 is fixedly engaged with the pivotal block 32, which, in turn, is in pivotal connection with an engaging rod 16. The link 33 includes a first end pivotally connected to a side of the pivotal block 32 and a second end pivotally connected to the positioning block 34. The positioning block 34 is engaged with the actuating rod 37 at a side thereof and includes a first end that is in pivotal connection with the link 33 and a second end with a plurality of positioning notches 341, 342, and 343. The engaging block 35 and the spring 36 are mounted in a hole 15 of the casing 1 such that the engaging end 351 of the engaging block 35 is biased by the spring 36 to engage with one of the positioning notches 341, 342, and 343. The actuating rod 37 includes an end secured to the positioning block 34 with the other end of the actuating rod 37 extended into the compartment 11 of the casing 1. The actuating rod 37 further includes an engaging member 371 for engaging with the groove 2244 of the follower block 224 on the output gear means 22.

Figure 4:
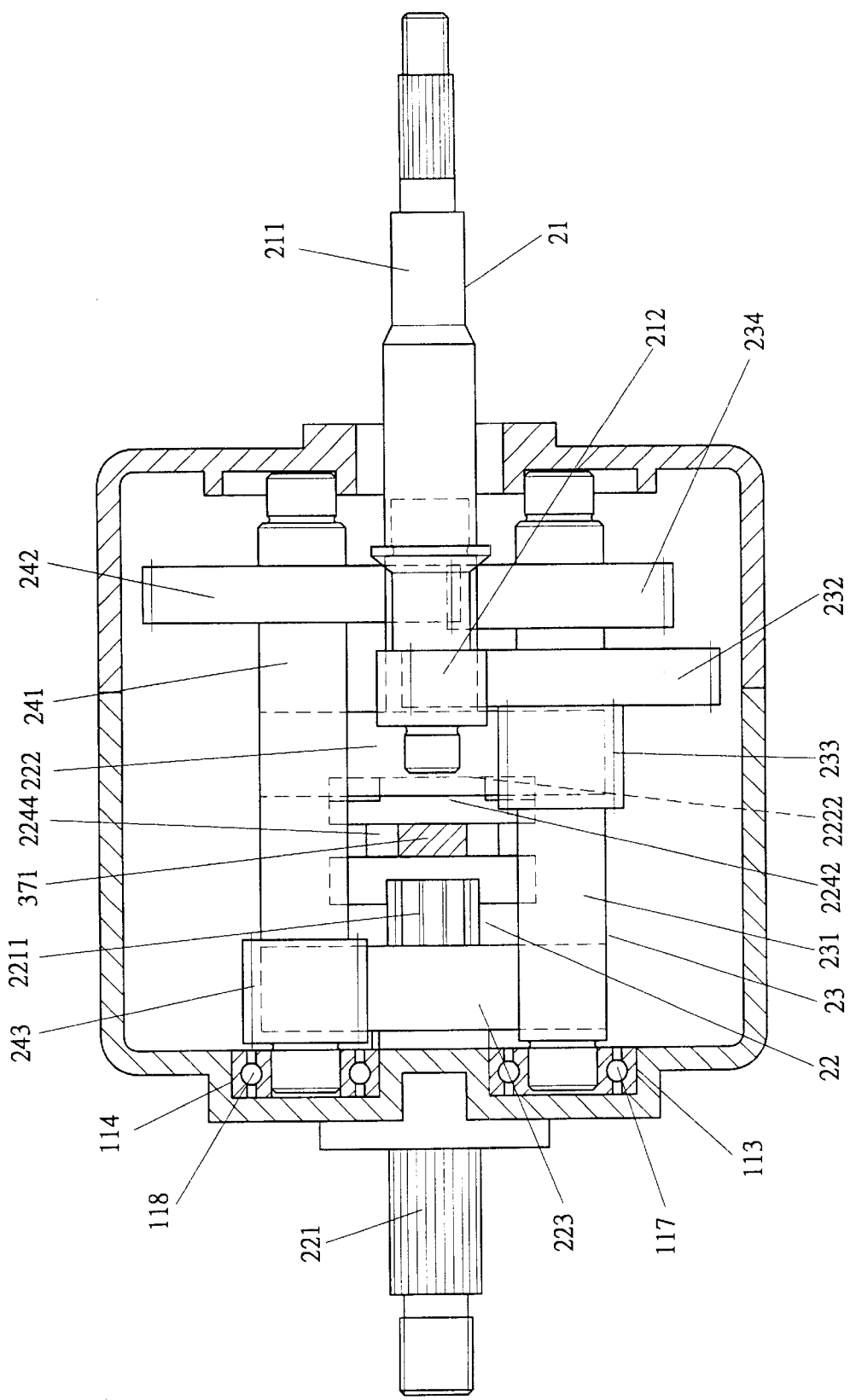
FIG. 4 is a sectional view of the gearbox in a forward gear.
Figure 5:
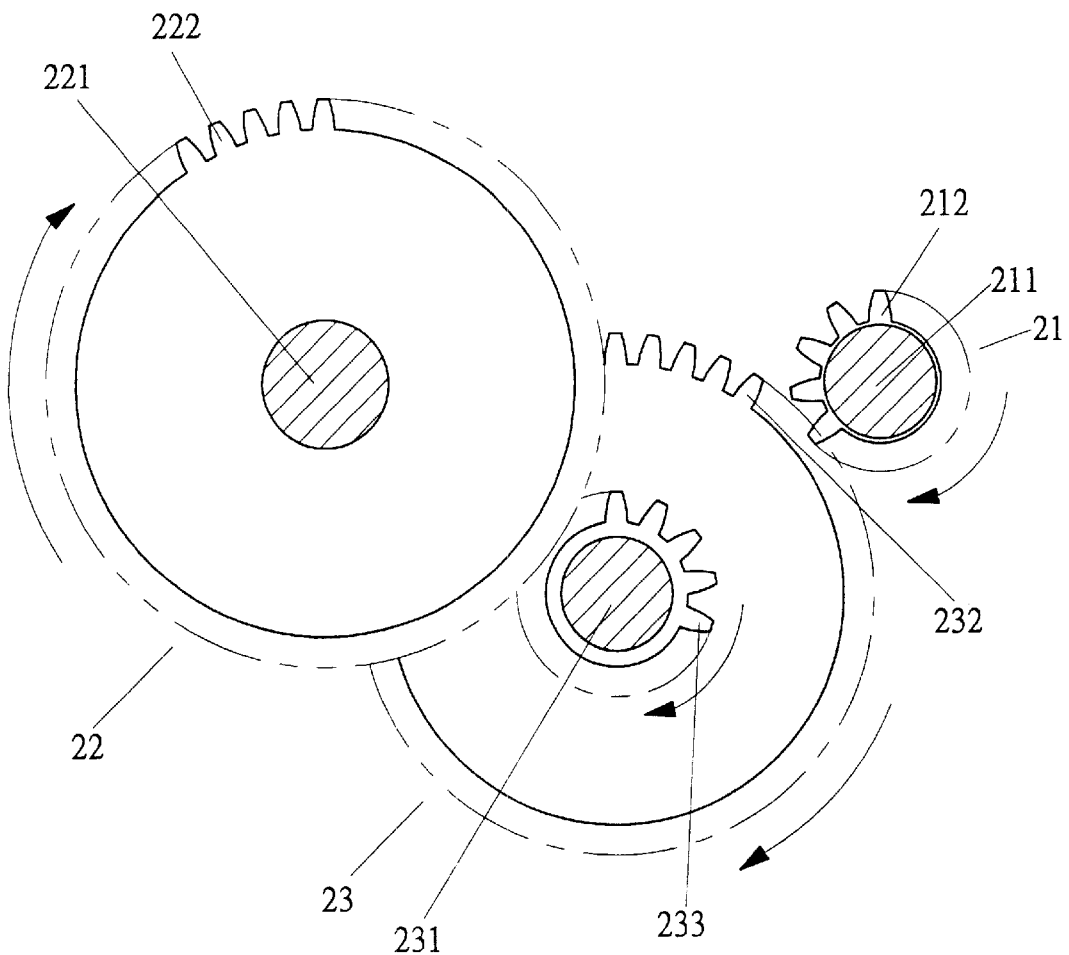
FIG. 5 is a schematic view illustrating engagement of gears in the forward gear.

Referring to FIGS. 3 through 8, in operation, the driver may adjust the gear lever 31 to cause one of the positioning notches 341, 342, and 343 to engage with the engaging end 351 of the engaging block 35 and to cause the actuating rod 37 and the follower block 324 to move accordingly. As illustrated in FIGS. 4 and 5, when the positioning notch 341 of the positioning block 34 is engaged with the engaging end 351 (the forward gear), the engaging member 371 of the actuating rod 37 urges the protrusion 2242 of the follower block 224 to engage with the gear 222. When the engine is started to drive the input gear means 21, the gear 212 drives the gear 232 of the transmission gear means 23 and the gear 233 of the transmission gear means 23 drives the gear 222. As a result, the gear shaft 221 of the output gear means 22 drives one of the wheels of the motorcycle and the motorcycle moves forward accordingly. Since the gear 223 is not engaged with the follower block 224 at this time, the former turns freely when it is driven by the gear 234 to turn in an opposite direction. Namely, it is impossible to drive the gear shaft 221 by the gear 222.

Figure 6:
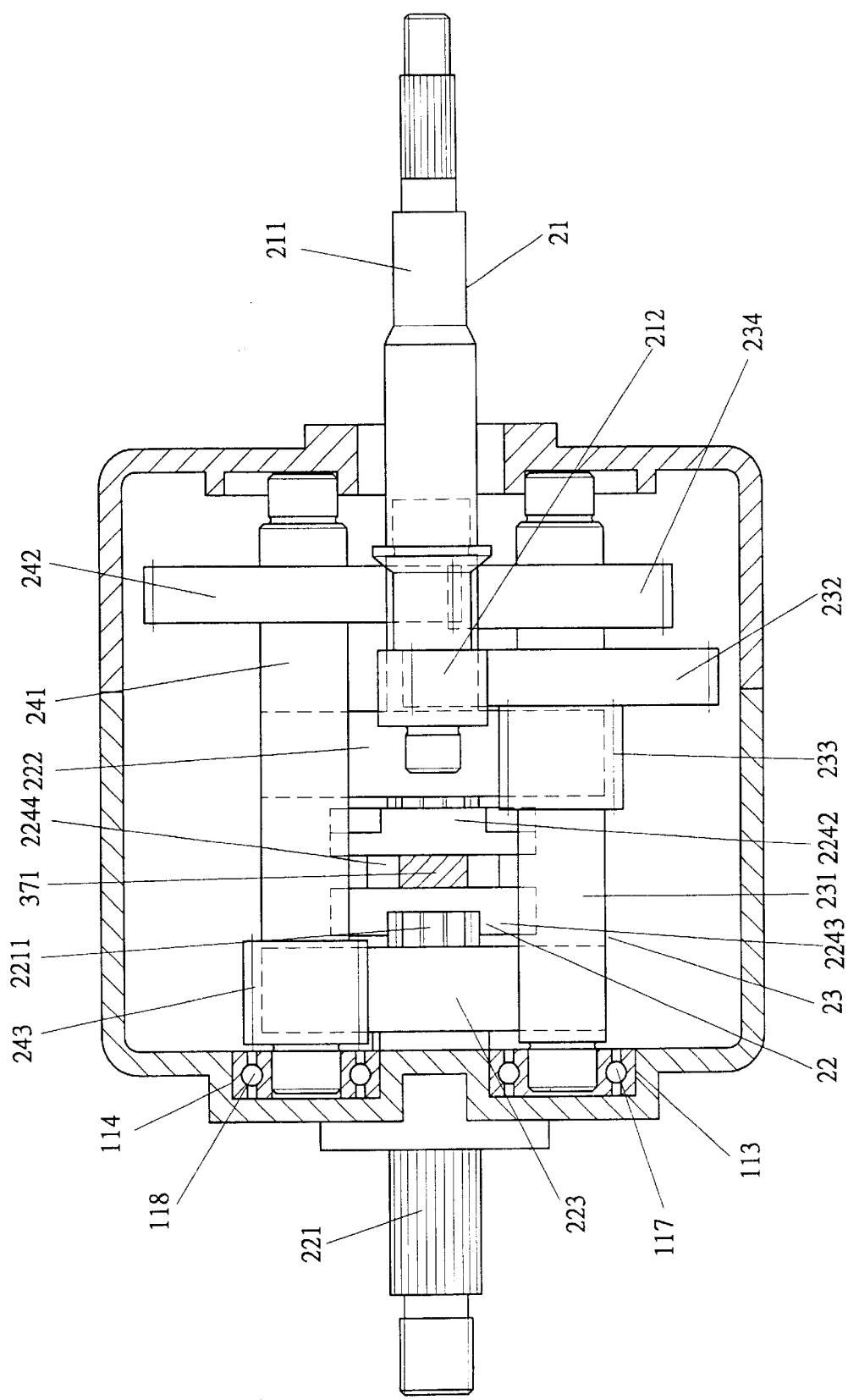
FIG. 6 is a sectional view of the gearbox in a neutral gear.

Referring to FIG. 6, when the positioning notch 342 of the positioning block 34 engages with the engaging end 351 (the neutral gear) by shifting the gear lever 31, the actuating rod 37 causes the protrusions 2242 and 2243 of the follower block 224 to disengage from the gears 222 and 223. As a result, the gear shaft 221 of the output gear means 22 rotate freely.

Figure 7:
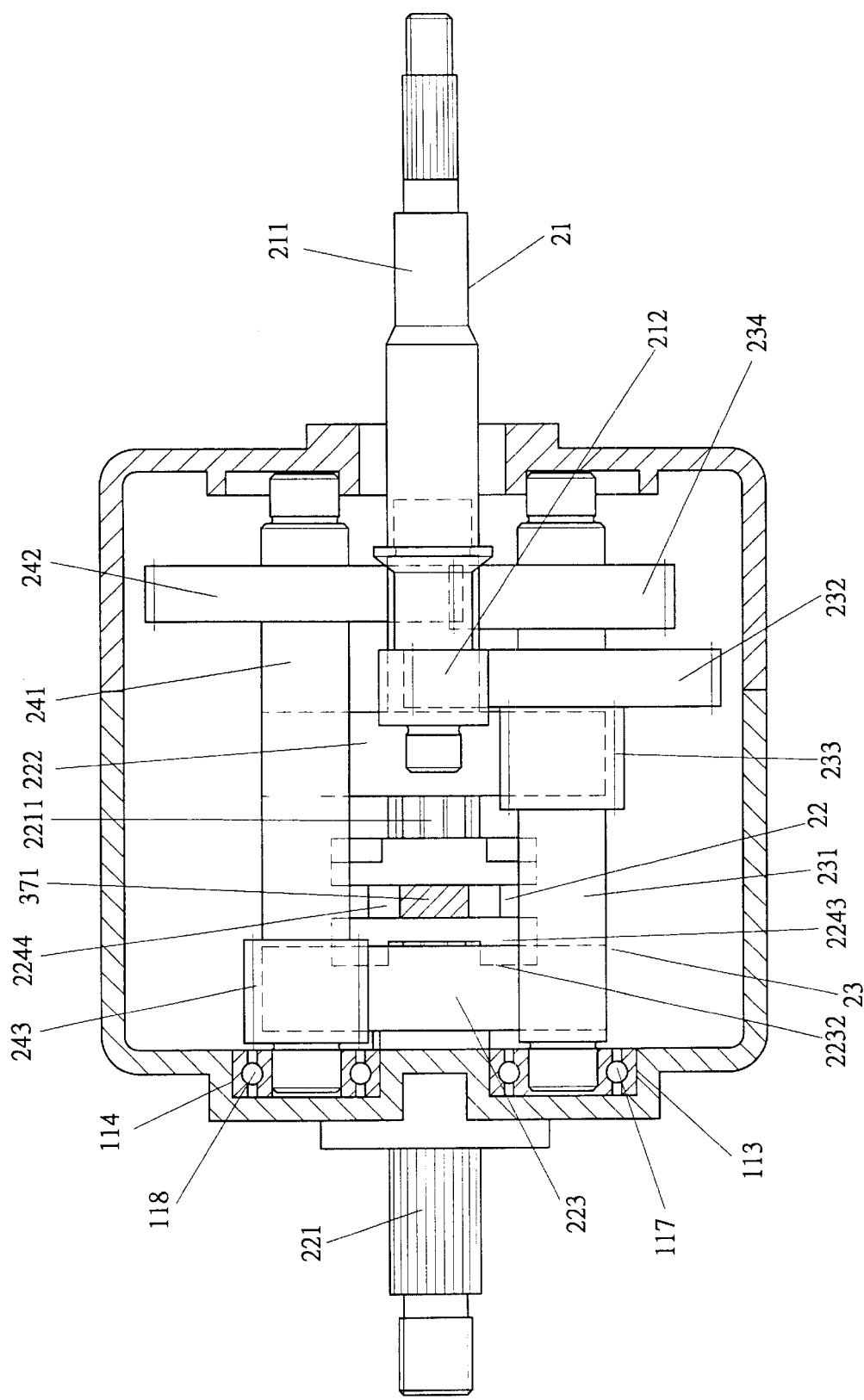
FIG. 7 is a sectional view of the gearbox in a reverse gear.
Figure 8:
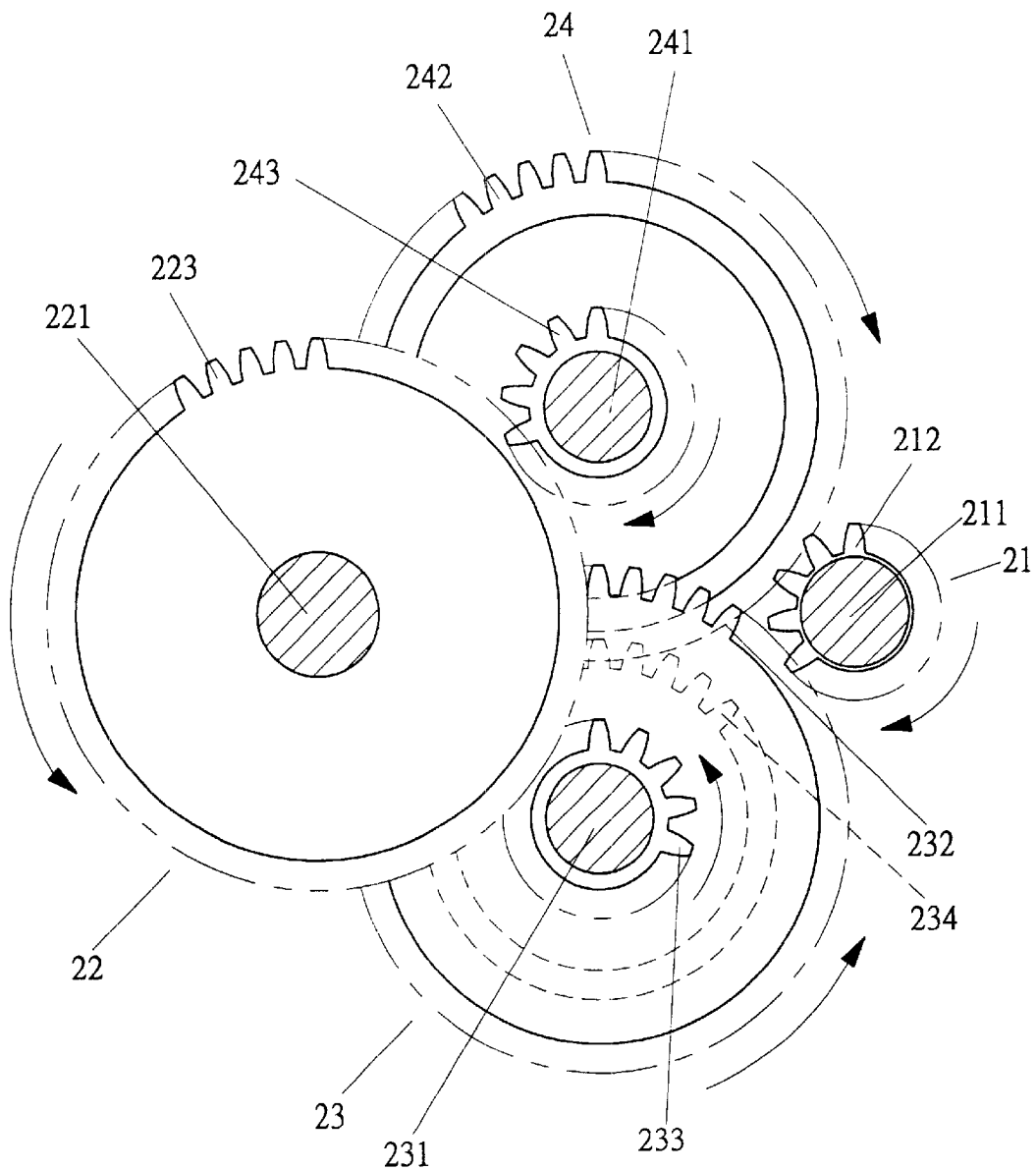
FIG. 8 is a schematic view illustrating engagement of gears in the reverse gear.

Referring to FIGS. 7 and 8, when the gear lever 31 is shifted to cause the positioning notch 343 to engage with the engaging end 351 (the reverse gear), the engaging member 371 of the actuating rod 37 urges the protrusion 2243 of the follower block 224 to engage with the gear 223. When the input gear means 21 is driven, the gear 234 on the transmission gear means 23 drives the gear 242 of the transmission gear means 24. The gear 243 drives the gear 223 to turn in a reverse direction. As a result, the gear shaft 221 of the output gear means 22 drives one of the wheels of the motorcycle and the motorcycle moves backward accordingly. It is noted that the gear 222 is not engaged with the follower block 224 at this time.

According to the above description, it is appreciated that the gearbox in accordance with the present invention allows a motorcycle to move forward or backward, which is quite convenient to handicapped drivers and beach motorcycle drives. It is further appreciated that the gearbox in accordance with the present invention can be used for any wheeled vehicles with an engine, not limited to motorcycles.

Although the invention has been explained in relation to its preferred embodiment, it is to be understood that many other possible modifications and variations can be made without departing from the scope of the invention as hereinafter claimed.

What is claimed is:

1. A gearbox for a motorcycle with an engine and at least two wheels, the gearbox comprising:
    a) a casing (1) including a compartment (11);
    b) a gear train (2) including:
    an input gear means (21) including a gear shaft (211) rotatably mounted in the compartment (11) and operably connected to and thus driven by an engine of the motorcycle, and
    an output gear means (22) including a gear shaft (221) rotatably mounted in the compartment (11) and operably connected to one of at least two wheels of the motorcycle, a first gear (222) and a second gear (223) being rotatably mounted around the gear shaft (221) of the output gear means (22), a follower block (224) being mounted around the gear shaft (221) of the output gear means (22) and located between the first gear (222) and the second gear (223), the follower block (224) being slidable along a longitudinal axis of the gear shaft (221) of the output gear means (22) for releasably engaging with one of the first gear (222) and the second gear (223);
    c) a control device (30) including a gear lever (31) that is operably connected to move the follower block (224) between a first position and a second position;
    wherein when the follower block (224) is in the first position, the follower block (224) is engaged with the first gear (222) such that the gearbox is in a forward gear for moving the motorcycle forward; and when the follower block (224) is in the second position, the follower block (224) is engaged with the second gear (223) such that the gearbox is in a reverse gear for moving the motorcycle backward;

d) a first transmission gear means (23) including a gear shaft (231) rotatably mounted in the compartment (11), a third gear (232), a fourth gear (233), and a fifth gear (234) being mounted on the gear shaft (231) of the first transmission gear means (23) to rotate therewith, the fourth gear (233) being meshed with the first gear (222), and e) a second transmission gear means (24) including a gear shaft (241) rotatably mounted in the compartment (11), a sixth gear (242) and a seventh gear (243) being mounted to the gear shaft (241) of the second transmission gear means (24) to rotate therewith, the sixth gear (242) being meshed with the fifth gear (234), the seventh gear (243) being meshed with the second gear (223);

the gear shaft (211) of the input gear means (21) including an eighth gear (212) provided thereon to rotate therewith, the eighth gear (212) being meshed with the third gear (232).

2. The gearbox as claimed in claim 1, wherein the follower block (224) is movable to a third position where none of the first gear (222) and the second gear (223) is engaged with the follower block (224) such that the gearbox is in a neutral gear.

3. The gearbox as claimed in claim 1, wherein the output gear means (22) includes a longitudinal keyway (2211) and the follower block (224) includes a longitudinal hole with a longitudinal key (2241) for engaging with the longitudinal keyway (2211).

4. The gearbox as claimed in claim 1, wherein the first gear (222) includes at least one engaging groove (2222) defined in a side thereof, the second gear (223) including at least one engaging groove (2232) defined in a side thereof, the follower block (224) including at least one protrusion (2242, 2243) on each of two sides thereof for releasable engaging with said at least one engaging groove (2222) of the first gear (222) and said at least one engaging groove (2232) of the second gear (223), respectively.

5. The gearbox as claimed in claim 1, wherein the follower block (224) includes a groove (2244) in a side thereof, the control device (3) further comprising a control rod (37) operably connected to the gear lever (31), the control rod (37) being engaged with the groove (2244) of the follower block (224), whereby the follower block (224) is movable among the first position, the second position, and the third position upon manual operation on the gear lever (31).

6. The gearbox as claimed in claim 5, further comprising means for retaining the control rod in place.

7. The gearbox as claimed in claim 5, wherein the control device further comprises a positioning block (34) securely attached to an end of the control rod (37), the positioning block (34) including three positioning notches (341, 342 and 343) that correspond to the first position, the second position, and the third position of the follower block (224), an engaging block (35) being biased to engage with one of the three positioning notches (341, 342, and 343) for retaining the positioning block (34) in place, thereby retaining the control rod (37) and the follower block (224) in place.

* * * * *